United States Patent
Beckner et al.

(10) Patent No.: US 11,047,530 B2
(45) Date of Patent: Jun. 29, 2021

(54) PRESSURE VESSEL HAVING GROOVED LINER

(71) Applicant: GM Global Technology Operations LLC, Detroit, MI (US)

(72) Inventors: Matthew Beckner, Holly, MI (US); Edward A. Anculle, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 359 days.

(21) Appl. No.: 16/175,218

(22) Filed: Oct. 30, 2018

(65) Prior Publication Data
US 2020/0132253 A1 Apr. 30, 2020

(51) Int. Cl.
*F17C 1/16* (2006.01)

(52) U.S. Cl.
CPC ........ *F17C 1/16* (2013.01); *F17C 2201/0109* (2013.01); *F17C 2203/0604* (2013.01); *F17C 2203/0619* (2013.01); *F17C 2203/0673* (2013.01); *F17C 2205/0305* (2013.01); *F17C 2209/22* (2013.01); *F17C 2209/232* (2013.01)

(58) Field of Classification Search
CPC ............... F17C 1/06; F17C 2201/0104; F17C 2201/01092; F17C 201/0119; F17C 2201/0114; F17C 2203/0604; F17C 2203/0619; F17C 2203/0621
See application file for complete search history.

(56) References Cited

U.S. PATENT DOCUMENTS

| | | | | |
|---|---|---|---|---|
| 3,446,385 | A | * 5/1969 | Ponemon | F17C 1/16 220/590 |
| 4,835,975 | A | * 6/1989 | Windecker | F17C 1/14 220/560.05 |
| 7,870,971 | B2 | 1/2011 | Schlag | |
| 8,906,287 | B2 | 12/2014 | Hatta | |
| 9,618,160 | B2 | 4/2017 | Eihusen et al. | |
| 2013/0341235 | A1 | 12/2013 | Leavitt | |
| 2014/0303287 | A1* | 10/2014 | Li | C04B 20/1037 524/4 |

FOREIGN PATENT DOCUMENTS

JP 2011106514 A 6/2011
RU 2187746 c2 8/2002

* cited by examiner

*Primary Examiner* — Andrew T Kirsch
(74) *Attorney, Agent, or Firm* — Quinn IP Law

(57) ABSTRACT

Pressure vessels having a grooved liner and methods of forming the same are described. The pressure vessel includes a liner surrounding a cavity therein, an outer surface of the liner disposed opposite the cavity, a boss disposed at a first end of the liner, a composite layer surrounding the liner, an inner surface of the composite layer disposed proximate the liner, and a plurality of longitudinal grooves configured to release gas present between the inner surface of the composite layer and the outer surface of the liner. The liner defines a longitudinal axis therethrough. The boss and the outer surface of the liner define the plurality of longitudinal grooves therein. The plurality of longitudinal grooves extends along the longitudinal axis from the boss toward a second end of the liner. The composite layer spans each of the plurality of longitudinal grooves.

12 Claims, 3 Drawing Sheets

PRESSURE VESSEL HAVING GROOVED LINER

INTRODUCTION

The disclosure relates to the field of pressure vessels and, more specifically, to systems and methods employing pressure vessels having a grooved liner.

Pressure vessels are used for containing a variety of fluids under pressure, such as, for example, hydrogen, natural gas, helium, etc. Pressure vessels may include a composite shell and a resin liner for containing the fluid. The resin liner may buckle during discharge of the fluid. The fluid diffuses through the liner and the composite shell at different rates, and the diffused fluid, during depressurization of the vessel or discharge of the pressure vessel, may accumulate between the resin liner and the composite shell to form a pocket of gas that is pressurized relative to the stored fluid. This difference in pressure may result in the resin liner bulging inward and delaminating from the composite shell. Moreover, strain on the composite shell from the trapped gas may allow cracking of the composite shell such that the trapped gas is forced through the composite shell and into the atmosphere upon the next charging of the pressure vessel. The force exerted may result in an undesirable amount or concentration of the fluid in the environment proximate the pressure vessel.

SUMMARY

It is desirable to inhibit accumulation of gases between a liner of the pressure vessel and an adjacent layer, such as a composite layer. Systems, methods, and pressure vessels in accordance with the present disclosure implement a liner having grooves in an outer surface thereof that are configured to release gas present between the outer surface of the liner and the inner surface of the composite layer. Further, systems, methods, and pressure vessels in accordance with the present disclosure may release the trapped gas in response to decreasing pressure of the stored fluid.

According to aspects of the present disclosure, a pressure vessel includes a liner surrounding a cavity therein, an outer surface of the liner disposed opposite the cavity, a boss disposed at a first end of the liner, a composite layer surrounding the liner, an inner surface of the composite layer disposed proximate the liner, and a plurality of longitudinal grooves configured to release gas present between the inner surface of the composite layer and the outer surface of the liner. The liner defines a longitudinal axis therethrough. The boss is coupled to the liner to form a substantially airtight seal therebetween. The boss and the outer surface of the liner define the plurality of longitudinal grooves therein. The plurality of longitudinal grooves extends along the longitudinal axis from the boss toward a second end of the liner. The composite layer spans each of the plurality of longitudinal grooves.

According to further aspects of the present disclosure, further comprising a plurality of inserts, each of the plurality of inserts disposed in a respective one of the plurality of longitudinal grooves.

According to further aspects of the present disclosure, wherein each of the plurality of inserts is formed from materials having a high coefficient of thermal expansion.

According to further aspects of the present disclosure, wherein each of the plurality of inserts is configured to substantially fill, in response to a temperature of the plurality of inserts being above a predetermined temperature, the respective one of the plurality of longitudinal grooves.

According to further aspects of the present disclosure, wherein the predetermined temperature corresponds to a curing temperature for the composite layer.

According to further aspects of the present disclosure, wherein each of the plurality of inserts is configured to shrink, in response to discharge of pressurized gas stored within the cavity, to thereby release gas between the inner surface of the composite layer and the outer surface of the composite layer through the respective one of the plurality of longitudinal grooves.

According to further aspects of the present disclosure, wherein at least one conduit is defined between each of the plurality of inserts and the respective longitudinal groove.

According to further aspects of the present disclosure, wherein the inserts are configured to define the at least one conduit in response to discharge of pressurized gas stored within the cavity.

According to further aspects of the present disclosure, the plurality of inserts are disposed within the longitudinal grooves such that the outer surface of the liner is continuous after pressure equalization and discontinuous in response to discharge of the pressure vessel.

According to aspects of the present disclosure, the method includes forming a liner surrounding a cavity therein, obtaining a boss defining a plurality of second grooves, attaching the boss to a first end of the liner, introducing each of a plurality of inserts to a respective one of a plurality of longitudinal grooves, applying a composite layer to thereby surround the liner, and curing the composite layer at an elevated temperature such that each of the plurality of inserts substantially fills the respective one of the plurality of longitudinal grooves in response to a temperature of the plurality of inserts being above a predetermined temperature. The liner defines a longitudinal axis therethrough. The liner includes an outer surface disposed opposite the cavity. The liner defines a plurality of first grooves on the outer surface thereof. The boss is attached such that each of the plurality of first grooves aligns with a respective one of the plurality of second grooves to thereby form the plurality of longitudinal grooves extending along the longitudinal axis from the boss toward a second end of the liner. The composite layer spans each of the plurality of longitudinal grooves.

According to further aspects of the present disclosure, further comprising cooling, after curing the composite layer, the pressure vessel and removing the plurality of inserts from the plurality of longitudinal grooves.

According to further aspects of the present disclosure, wherein each of the plurality of inserts is formed from materials having a high coefficient of thermal expansion.

According to further aspects of the present disclosure, wherein each of the plurality of inserts is configured to shrink, in response to discharge of pressurized gas stored within the cavity, to thereby release gas between an inner surface of the composite layer and the outer surface of the liner through the respective one of the plurality of longitudinal grooves.

According to further aspects of the present disclosure, wherein at least one conduit is defined between each of the plurality of inserts and the respective longitudinal groove.

According to further aspects of the present disclosure, wherein the at least one conduit is defined only during discharge of pressurized gas within the cavity.

According to further aspects of the present disclosure, wherein the plurality of inserts are disposed within the longitudinal grooves such that the outer surface of the liner is continuous after pressure equalization and discontinuous in response to discharge of the pressure vessel.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings are illustrative and not intended to limit the subject matter defined by the claims. Exemplary aspects are discussed in the following detailed description and shown in the accompanying drawings in which:

DETAILED DESCRIPTION

Figure 1:
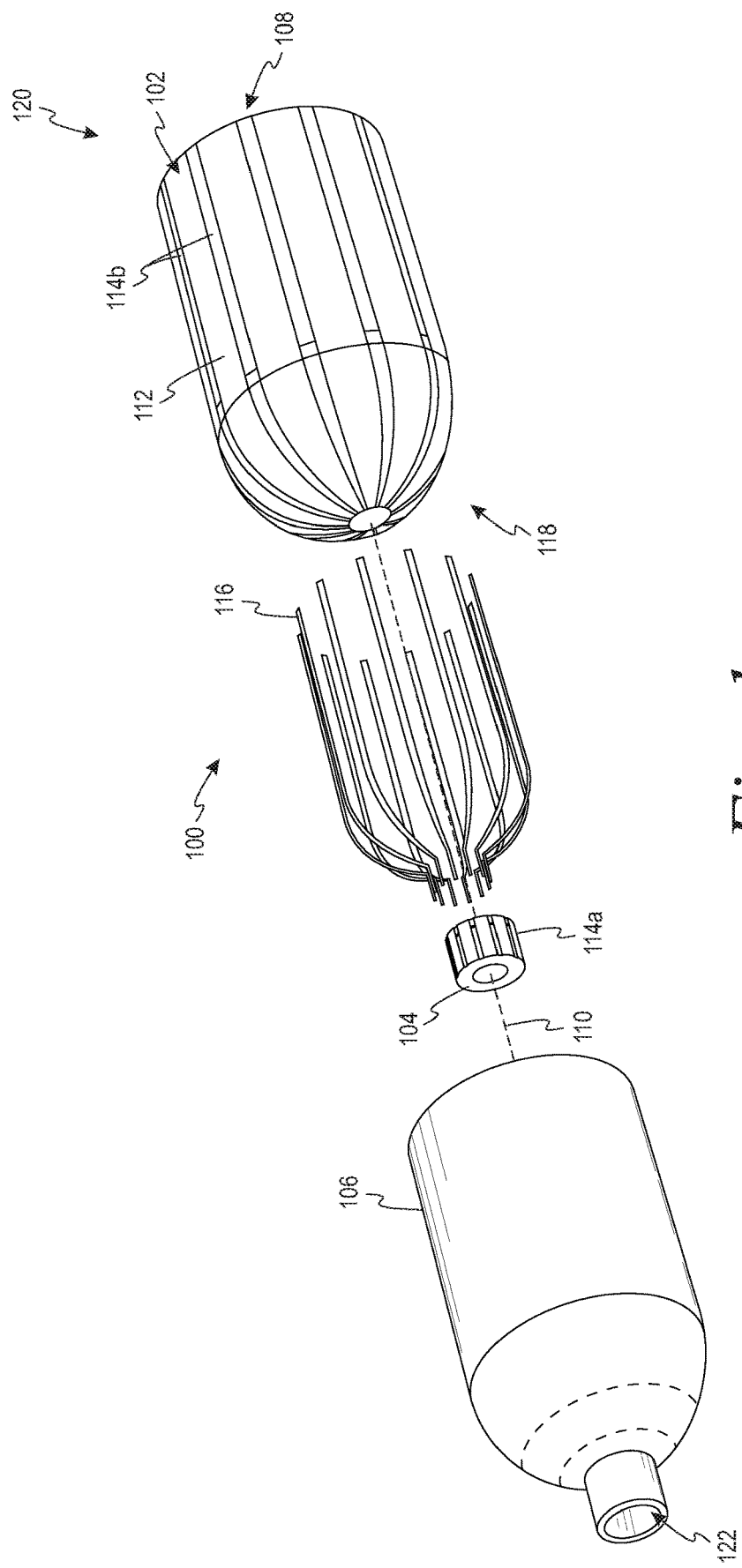
FIG. 1 is a schematic illustration of an exploded view of a pressure vessel, according to some aspects of the present disclosure.

FIG. 1 illustrates an exploded view of a pressure vessel 100 according to aspects of the present disclosure. The pressure vessel 100 includes a liner 102, a boss 104, and a composite layer 106. Because the liner 102 and composite layer 106 have differing permeability, gas may accumulate between these components and cause the liner 102 to buckle during, for example, discharge of the pressure vessel 100. Beneficially, systems, methods, and pressure vessels 100 in accordance with the present disclosure use longitudinal grooves 114 within the liner 102 that are configured to release the trapped gasses. Further, systems, methods, and pressure vessels 100 in accordance with the present disclosure may include inserts 116 to inhibit ingress of resin into the longitudinal grooves 114 when forming the composite layer 106.

Systems, methods, and pressure vessels in accordance with the present disclosure may release the trapped gas in response to decreasing pressure of the stored fluid. Beneficially, systems, methods, and pressure vessels 100 as described herein may optimize pressure vessel 100 integrity and longevity by inhibiting buckling of the liner 102. Further, systems, methods, and pressure vessels 100 as described herein may provide for discharge of the stored fluid until 0 psig, thereby increasing the useful amount of gas within the pressure vessel 100.

The liner 102 surrounds a cavity 108 therein. The liner 102 is disposed about and defines a longitudinal axis 110 therethrough. The liner 102 includes an outer surface 112 disposed opposite the cavity. The outer surface 112 defines a plurality of first grooves 114a thereon. The first grooves 114a are spaced a distance apart and distributed about the liner 102. In some aspects, the first grooves 114a are spaced to allow for deformation of the liner 102 during discharge of the pressure vessel 100 while inhibiting buckling of the liner 102. For example, an analysis of the liner 102 may be conducted to determine conditions under which the liner 102 will buckle (e.g., determining a pressure differential or level of deformation that will likely result in non-elastic or plastic deformation). The first grooves 114a may then be spaced such that trapped gas will reach a longitudinal groove 114 prior to the liner 102 reaching a plastic deformation.

In some aspects, the liner 102 is a polymeric liner formed from polyamide or high-density polyethylene. The liner may be formed using, for example, blow molding or injection molding. The molds may include a plurality of features on a wall thereof configured to produce the desired plurality of first grooves 114a. In some aspects, a plurality of inserts 116 is placed within the mold to define the plurality of first grooves 114a. In some aspects, the plurality of inserts 116 is regularly spaced about the mold. Beneficially, first grooves 114a being generally longitudinal may be aligned with material flow during the molding process to thereby inhibit occlusions and optimize the integrity of the liner 102. The liner 102 may be formed by molding a plurality of portions thereof, and then bonding the portions together to form a unitary liner 102. For example, the liner 102 may be molded in quarters, and a respective pair of quarters may be bonded to form a hemispherical end portion and cylindrical body extending therefrom. The two halves may then be bonded along a flange formed at the end of the cylindrical body opposite the hemispherical end to form a unitary liner 102 having a cylindrical body with hemispherical ends. In some aspects, the plurality of first grooves 114a is continuous from the first hemispherical end of the liner 102 to the opposite hemispherical end of the liner 102.

The boss 104 is disposed at a first end 118 of the liner 102. The boss 104 is coupled to the liner 102 to form a substantially airtight seal therebetween. In some aspects, the pressure vessel 100 includes a second boss disposed at an opposite end of the vessel.

The boss 104 includes a plurality of second grooves 114b thereon. The plurality of second grooves 114b aligns with the plurality of first grooves 114a such that respective ones of the first grooves 114a and second grooves 114b form longitudinal grooves 114 extending along the longitudinal axis 110 from the boss 104 toward a second end 120 of the liner 102. In some aspects, the longitudinal grooves 114, the first grooves 114a, and/or the second grooves 114b may also include a transverse movement to thereby form a helical pattern.

The boss 104 may be formed from materials such as aluminum or stainless steel. The boss 104 and features thereof may be formed by milling, molding, or other suitable processes.

The composite layer 106 surrounds the liner 102. As used herein, the composite layer 106 is a fiber reinforced resin matrix material. In some aspects, the composite layer 106 is a filament-wound structure or laminated structure. For example, the composite layer 106 may be a carbon fiber reinforced polymer or a wound fiberglass filament reinforced polymer.

The composite layer 106 includes an inner surface 122 disposed proximate the liner 102. In some aspects, the inner surface 122 of the composite layer abuts the outer surface 112 of the liner 102.

The plurality of longitudinal grooves 114 is configured to release gas present between the inner surface 122 of the composite layer 106 and the outer surface 112 of the liner 102 to the environment surrounding the pressure vessel 100. The composite layer 106 spans each of the plurality of longitudinal grooves 114. During discharge of the pressure vessel 100, the reduced pressure within the cavity 108 results in deformation of the outer surface 112 of the liner 102 by the relatively greater pressure of trapped gasses. The liner 102 is configured to deform until the pocket of trapped gas reaches one of the plurality of longitudinal grooves 114 at which point the trapped gas enters the longitudinal groove 114 and the pocket is depressurized.

The pressure vessel 100 may further include a plurality of inserts 116 disposed in the plurality of longitudinal grooves 114. The inserts 116 are configured to inhibit ingress of resin or other material into the plurality of longitudinal grooves 114 when the composite layer 106 or another adjacent layer is formed. Each insert 116 spans a respective longitudinal groove 114 along the outer surface 112 to substantially seal the longitudinal groove 114 from the resin. In some aspects, the inserts 116 are shaped such that liner 102 and inserts 116 form a substantially continuous outer surface 112 while the composite layer 106 is formed while deformation of the liner 102 by trapped gas produces a separation between the liner 102 and the insert 116 such that the trapped gas may escape through the longitudinal groove 114 or a conduit formed by the longitudinal groove 114 and the insert 116.

The inserts 116 may be formed from suitable flexible and/or thermally expandable materials. In some aspects, the inserts 116 are formed from polypropylene or polytetrafluoroethylene. In some aspects, the inserts 116 are formed using an extrusion process.

In some aspects, the inserts 116 are formed from materials having a high coefficient of thermal expansion. As used herein, unless the specific context of use dictates otherwise, "high" and "low" coefficients of thermal expansion are comparative terms used to quantify movement of the material relative to surrounding materials. For example, a structure or material having a high coefficient of thermal expansion will increase or decrease in size at a rate greater than the surrounding material such that decreases in temperature lessen or terminate contact between surfaces of the two structures and increases in temperature increase or actuate contact between surfaces of the two structures. A coefficient of thermal expansion is considered "high" when being at least 20% greater than the coefficient of thermal expansion of surrounding materials. In some aspects, the coefficient of thermal expansion is at least 30% greater than that of surrounding materials. In some aspects, the coefficient of thermal expansion is at least 50% greater than that of surrounding materials.

Figure 2A:
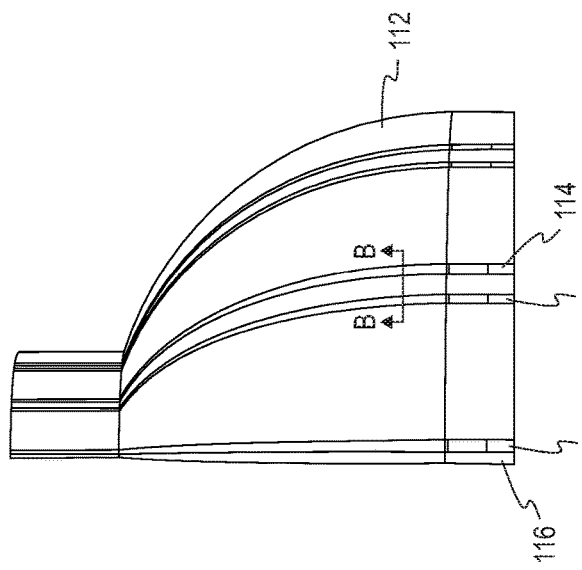
FIG. 2A is a schematic view of a liner of the pressure vessel of FIG. 1 in a first state.
Figure 2B:
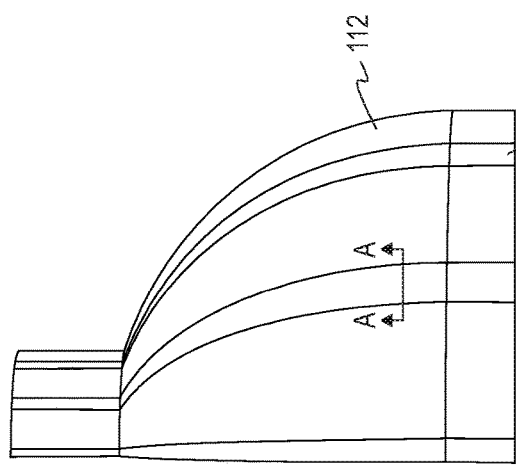
FIG. 2B is a schematic view of the liner of the pressure vessel of FIG. 1 in a second state.

FIGS. 2A and 2B illustrate the pressure vessel 100 with the plurality of inserts 116 having a high coefficient of thermal expansion and the composite shell 106 removed for clarity. FIG. 2A illustrates the pressure vessel 100 in a first state, and FIG. 2B illustrates the pressure vessel 100 in a second state. In the first state, the insert 116 is at an elevated temperature whereas, in the second state, the insert 116 is at a depressed temperature. As can be seen in FIG. 2A, the inserts 116 at the higher temperature completely fill the longitudinal grooves 114, whereas the inserts 116 at the lower temperature provide passageways for gas trapped between the outer surface 112 and the inner surface 122 of the composite layer 106 to escape to the atmosphere via the boss 104. While the illustrated inserts 116 are shown as having a shape corresponding to the shape of the groove, it is contemplated that differing shapes may be employed. For example, at least one of the longitudinal groove 114 and the insert 116 may be generally trapezoidal in cross-section relative to the curved surface while the other is generally rectangular relative to the curved surface.

Figure 3A:
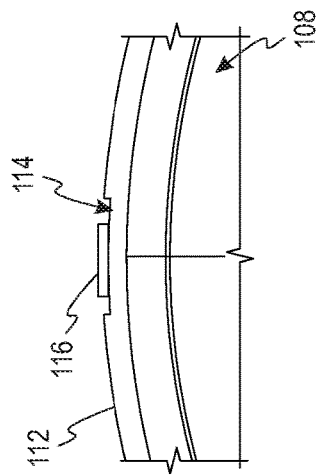
FIG. 3A is a schematic cross-sectional view of the liner taken along line A-A of FIG. 2A.

FIG. 3A is cross-sectional view of the liner 102 taken along line A-A of FIG. 2A. As can be seen, the insert 116 completely fills the longitudinal groove 114 and provides a generally continuous surface along the outer surface 112 of the liner 102. Beneficially, liners 102 described herein optimize structural integrity of the composite layer 106. For example, by providing the inner surface 122 with a substantially circular cross-sectional shape at the elevated curing temperature, structural integrity is optimized by inhibiting points of increased and decreased stress.

Figure 3B:
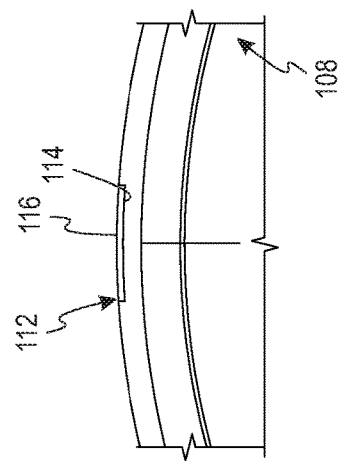
FIG. 3B is a schematic cross-sectional view of the liner taken along line B-B of FIG. 3A.

FIG. 3B is a schematic cross-sectional view of the liner 102 taken along line B-B of FIG. 2B. As can be seen, the insert 116 may be configured to expand and contract generally along its width while not generally expanding or contracting along its height. An aspect ratio of the insert 116 and/or a geometry defined by the insert 116 may be selected to promote this behavior.

Figure 4:
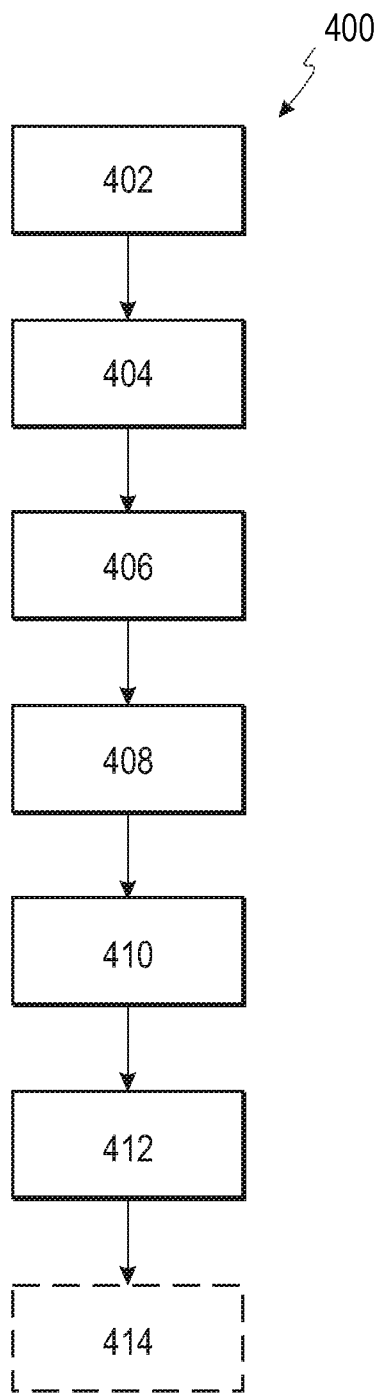
FIG. 4 is a flowchart of a method of forming the pressure vessel, according to some aspects of the present disclosure.

Referring now to FIG. 4, a method 400 of forming the pressure vessel 100. The method 400 includes forming 402 the liner 102 surrounding the cavity 108 therein, obtaining 404 the boss 104 defining the plurality of second longitudinal grooves 114b, attaching 406 the boss to the first end 118 of the liner 102, introducing 408 each of a plurality of inserts 116 to a respective one of the plurality of longitudinal grooves 114, applying 410 the composite layer 106 to thereby surround the liner 102, and curing 412 the composite layer 106 at an elevated temperature.

Optionally, the method 400 may further include cooling 414 the pressure vessel 100 and removing the plurality of inserts 116 from the plurality of longitudinal grooves 114.

While the best modes for carrying out the disclosure have been described in detail, those familiar with the art to which this disclosure relates will recognize various alternative designs and embodiments for practicing the disclosure within the scope of the appended claims.

What is claimed is:

1. A pressure vessel comprising:
a liner surrounding a cavity therein, the liner defining a longitudinal axis therethrough;
an outer surface of the liner disposed opposite the cavity;
a boss disposed at a first end of the liner, the boss being coupled to the liner to form a substantially airtight seal therebetween;
a composite layer surrounding the liner;
an inner surface of the composite layer disposed proximate the liner;
a plurality of longitudinal grooves configured to release gas present between the inner surface of the composite layer and the outer surface of the liner, the boss and the outer surface of the liner defining the plurality of longitudinal grooves therein, the plurality of longitudinal grooves extending along the longitudinal axis from the boss toward a second end of the liner, the composite layer spanning each of the plurality of longitudinal grooves; and
a plurality of inserts, each of the plurality of inserts disposed in a respective one of the plurality of longitudinal grooves;
wherein each of the plurality of inserts is configured to substantially fill the respective one of the plurality of longitudinal grooves in response to a temperature of the plurality of inserts being above a predetermined temperature; and
wherein a conduit is formed between each of the plurality of inserts and the plurality of longitudinal grooves, the conduit providing a passageway in the respective one of the plurality of longitudinal grooves in response to the temperature of the plurality of inserts being less than the predetermined temperature.

2. The pressure vessel of claim 1, wherein each of the plurality of inserts is formed from materials having a coefficient of thermal expansion that is at least 20% greater than coefficients of thermal expansion of the liner and the composite layer.

3. The pressure vessel of claim 1, wherein the predetermined temperature corresponds to a curing temperature for the composite layer.

4. The pressure vessel of claim 1, wherein each of the plurality of inserts is configured to shrink, in response to discharge of pressurized gas stored within the cavity, to thereby release gas between the inner surface of the composite layer and the outer surface of the composite layer through the respective one of the plurality of longitudinal grooves.

5. The pressure vessel of claim 1, wherein the inserts are configured to define the at least one conduit in response to discharge of pressurized gas stored within the cavity.

6. The pressure vessel of claim 1, wherein the plurality of inserts are disposed within the longitudinal grooves such that the outer surface of the liner is continuous after pressure equalization and discontinuous in response to discharge of the pressure vessel.

7. A method of forming a pressure vessel, the method comprising:
    forming a liner surrounding a cavity therein, the liner defining a longitudinal axis therethrough, the liner including an outer surface disposed opposite the cavity, the liner defining a plurality of first grooves on the outer surface thereof;
    obtaining a boss defining a plurality of second grooves;
    attaching the boss to a first end of the liner such that each of the plurality of first grooves aligns with a respective one of the plurality of second grooves to thereby form a plurality of longitudinal grooves extending along the longitudinal axis from the boss toward a second end of the liner;
    introducing each of a plurality of inserts to a respective one of the plurality of longitudinal grooves;
    applying a composite layer to thereby surround the liner, the composite layer spanning each of the plurality of longitudinal grooves; and
    curing the composite layer at an elevated temperature such that each of the plurality of inserts substantially fills the respective one of the plurality of longitudinal grooves in response to a temperature of the plurality of inserts being above a predetermined temperature;
    wherein a conduit is formed between each of the plurality of inserts and the plurality of longitudinal grooves, the conduit providing a passageway in the respective one of the plurality of longitudinal grooves in response to the temperature of the plurality of inserts being less than the predetermined temperature.

8. The method of claim 7, further comprising cooling, after curing the composite layer, the pressure vessel and removing the plurality of inserts from the plurality of longitudinal grooves.

9. The method of claim 7, wherein each of the plurality of inserts is formed from materials having a coefficient of thermal expansion that is at least 20% greater than coefficients of thermal expansion of the liner and the composite layer.

10. The method of claim 7, wherein each of the plurality of inserts is configured to shrink, in response to discharge of pressurized gas stored within the cavity, to thereby release gas between an inner surface of the composite layer and the outer surface of the liner through the respective one of the plurality of longitudinal grooves.

11. The method of claim 7, wherein the conduit is defined only during discharge of pressurized gas within the cavity.

12. The method of claim 7, wherein the plurality of inserts are disposed within the longitudinal grooves such that the outer surface of the liner is continuous after pressure equalization and discontinuous in response to discharge of the pressure vessel.

* * * * *